US012535770B2

(12) United States Patent
Christan et al.

(10) Patent No.: US 12,535,770 B2
(45) Date of Patent: Jan. 27, 2026

(54) BALANCE SPRING OF A SPRUNG BALANCE ASSEMBLY OF A MECHANICAL HOROLOGICAL MOVEMENT

(71) Applicant: ETA SA Manufacture Horlogère Suisse, Grenchen (CH)

(72) Inventors: Julien Christan, Bienne (CH); Raphaël Courvoisier, Corcelles (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 302 days.

(21) Appl. No.: 18/366,805

(22) Filed: Aug. 8, 2023

(65) Prior Publication Data

US 2024/0069493 A1 Feb. 29, 2024

(30) Foreign Application Priority Data

Aug. 30, 2022 (EP) .................................... 22192771

(51) Int. Cl.
*G04B 17/06* (2006.01)
*G04B 17/32* (2006.01)

(52) U.S. Cl.
CPC ......... *G04B 17/063* (2013.01); *G04B 17/325* (2013.01)

(58) Field of Classification Search
CPC .. G04B 17/063; G04B 17/325; G04B 17/066; G04B 17/34; G04B 18/06; G04B 17/32
USPC ........................................................ 368/169
See application file for complete search history.

(56) References Cited

U.S. PATENT DOCUMENTS 3,395,532 A * 8/1968 Schneider ............ G04B 17/325 368/176
2014/0022873 A1* 1/2014 Ching .................... G04B 17/06 368/175
2016/0147195 A1* 5/2016 Charbon ................ C22C 38/38 368/140

(Continued)

FOREIGN PATENT DOCUMENTS

CH 700653 A2 9/2010
CH 707 288 A1 5/2014
CH 708429 A1 2/2015

(Continued)

OTHER PUBLICATIONS

JP-2020008560-A Machine Translation from PE2E Search (Year: 2020).*
European Search Report of No. 22192771 dated Jan. 26, 2023.

*Primary Examiner* — Regis J Betsch
*Assistant Examiner* — Kevin Andrew Johnston
(74) *Attorney, Agent, or Firm* — Sughrue Mion, PLLC

(57) ABSTRACT

A balance spring (1) of a sprung balance assembly of a mechanical horological movement, formed by a succession of coils (S1, . . . , Sn) which extend between a first free end, referred to as inner first coil (2), and a second free end, referred to as outer last coil (6). The are arranged off-centre when the balance spring is in the free state, the outer last coil (6) terminating in a stop means for the attachment thereof to a stud (14). The balance spring (1) is centred and its spires concentric when the spring (1) is in the mounted state inside the sprung balance assembly, the coils being rearranged concentrically when the spring is in the mounted state. The attachment of the spring to the stud inducing, in the coils, a resilient stress as a result whereof the stop is attached in a captive manner to the stud (14).

9 Claims, 5 Drawing Sheets

(56) References Cited

U.S. PATENT DOCUMENTS

| | | | | | |
|---|---|---|---|---|---|
| 2017/0017204 | A1* | 1/2017 | Stranczl | ............... | G04B 17/325 |
| 2017/0351216 | A1* | 12/2017 | Balague | ................. | G04B 17/34 |

FOREIGN PATENT DOCUMENTS

| | | | | | |
|---|---|---|---|---|---|
| CH | 714775 | B1 | | 9/2019 | |
| EP | 1 780 611 | A2 | | 5/2007 | |
| EP | 3859449 | A1 | | 8/2021 | |
| JP | 51-103975 | U | | 8/1976 | |
| JP | 2008-139290 | A | | 6/2008 | |
| JP | 2017-26601 | A | | 2/2017 | |
| JP | 2019-200199 | A | | 11/2019 | |
| JP | 2020008560 | A | * | 1/2020 | ............. G04B 1/225 |

* cited by examiner

BALANCE SPRING OF A SPRUNG BALANCE ASSEMBLY OF A MECHANICAL HOROLOGICAL MOVEMENT

CROSS REFERENCE TO RELATED APPLICATIONS

This application is claiming priority based on European Patent Application No. 22192771.8 filed on Aug. 30, 2022.

TECHNICAL FIELD OF THE INVENTION

The present invention relates to a balance spring for a sprung balance assembly of a horological movement. The present invention further relates to a horological assembly comprising a balance spring and a stud.

TECHNOLOGICAL BACKGROUND

In the horological field, a balance spring, associated with a balance, forms a regulating member commonly referred to as a sprung balance for mechanical timepieces. The balance spring is initially viewed as a very thin spring that is wound about itself in concentric coils when no stress is exerted thereon. In the mounted state, a first end of the balance spring, referred to as the inner first coil, is attached to a collet fitted on a staff of the balance, and a second end of the balance spring, referred to as the outer last coil, is attached to a stud which is a part typically attached by means of a stud holder in a balance bridge.

More specifically, the time base for mechanical timepieces, also referred to as the oscillating system, comprises a sprung balance assembly and an escapement. The balance consists of a balance staff pivoted between a first and a second bearing and connected to a balance rim by means of radial arms. The balance spring is attached, by its inner first coil, to the staff of the balance, for example by means of a collet, and is attached, by its outer last coil, to a fixed attachment point such as a stud carried by a stud holder.

The escapement, in a very widespread embodiment thereof, comprises a double roller system consisting of a table-roller carrying an impulse pin and a safety-roller in which a notch is made. The escapement further comprises a pallet-lever with a pallet-staff pivoted between a first and a second bearing. The pallet-lever consists of a lever that connects a fork to an entry arm and to an exit arm. The fork consists of an entry horn and of an exit horn, between which a dart extends. The travel of the fork is limited by an entry banking pin and an exit banking pin, which can be made in one piece with a pallet-bridge. The entry arm and the exit arm carry an entry pallet and an exit pallet respectively. Finally, the pallet-lever cooperates with an escape wheel comprising an escape wheel arbor pivoted between a first and a second bearing.

A balance spring is a spring which adopts the shape of a spiral when at rest. Wound in a horizontal plane, parallel to the plane of the horological movement, the balance spring serves only one purpose: to make the balance oscillate about its position of equilibrium, also referred to as the dead centre, at as constant a frequency as possible. When the balance leaves its position of equilibrium by pivoting in a given direction, it tensions the balance spring. This creates a restoring torque in the balance spring that causes the balance to return to its position of equilibrium. During this beat, the balance spring expands. However, as the balance has acquired a certain speed, and thus kinetic energy, it exceeds its position of equilibrium in the opposite direction to the previous, which again tensions the balance spring until the restoring torque it exerts on the balance stops it again and forces it to turn in the other direction.

The balance spring thus alternately expands and contracts: it is said to breathe. However, many factors can play a part in preventing a balance spring from developing isochronously during the expansion and contraction phases. In particular, the balance spring must withstand oxidation and magnetism, which cause the coils to stick together and work to stop the watch. The influence of atmospheric pressure, on the other hand, is low. For a long time, temperature has been the main problem, because heat expands the metal, while cold shrinks it. The balance spring must thus be resilient so that it can deform and yet always return to its original shape.

The material used to produce balance springs is usually steel. Such steels are ductile and must withstand corrosion. Recent developments also propose producing balance springs from silicon. Silicon balance springs are more precise than their steel predecessors, in particular because they are insensitive to magnetism. However, they have a higher cost price and, because they are fragile, they are more difficult to assemble.

A balance spring must be isochronous. Regardless of how far the balance spring turns, it must always take the same amount of time to oscillate. If the balance spring contracts by just a few degrees, it accumulates little energy and returns slowly to its position of equilibrium. If the balance spring has moved far from its position of equilibrium, it very quickly moves in the opposite direction. The important thing is that these two journeys take the same amount of time to complete. The underlying idea is that the energy available to the balance spring is not constant and that it must still function, whether the watch is fully wound or in the final hours of its power reserve.

Due to the small dimensions thereof, balance springs are difficult to assemble. However, the way in which the two ends of a balance spring are attached also has a major influence on the precision of the rate of the horological movement. In most mechanical horological movements, the two ends of the balance spring are inserted into a drilled part and rendered immobile by means of a pin which is forcibly assembled manually using pliers. This can cause the balance spring to rotate slightly, which is detrimental to the precision of the rate of the movement.

Another technique consists of attaching the ends of the balance springs using an adhesive. However, this technique also has its limitations. It has been observed that, due to its viscosity, the adhesive exerts a tensile force on the balance spring by capillary action and can press the ends of the balance spring against the walls of the stud in which these ends are engaged. The resulting deformation of the balance spring induces mechanical stresses therein, which mechanical stresses are detrimental to keeping a consistent rate.

SUMMARY OF THE INVENTION

The purpose of the present invention is to overcome the aforementioned problems as well as others by providing a balance spring whose outer last coil can be reliably attached to a stud without the use of adhesive or pins, or operations such as clamping or crimping, etc.

To this end, the present invention relates to a balance spring of a sprung balance assembly of a mechanical horological movement, the balance spring being formed by a succession of coils which extend between a first free end, referred to as the inner first coil, and a second free end, referred to as the outer last coil, the coils of the balance spring being arranged off-centre when the balance spring is in the free state, the outer last coil of the balance spring terminating in a stop means for the attachment thereof to a stud, the balance spring being attached, by its inner first coil, to a staff of the balance, and by its outer last coil, to the stud when the balance spring is in the mounted state inside the sprung balance assembly mounted in the mechanical horological movement, the coils being arranged concentrically when this balance spring is in the mounted state, the attachment of the balance spring to the stud inducing, in the coils of the balance spring, a resilient stress as a result whereof the stop means is attached in a captive manner to the stud.

The present invention further relates to a horological assembly formed by a balance spring and a stud for a sprung balance assembly of a mechanical horological movement, the balance spring being formed by a succession of coils which extend between a first free end, referred to as the inner first coil, and a second free end, referred to as the outer last coil, the coils of the balance spring being arranged off-centre when the balance spring is in the free state, the outer last coil of the balance spring terminating in a stop means, the stud comprising a base in which a recess is made, which recess receives the stop means, the coils being rearranged in a concentric manner when this balance spring is in the mounted state inside the sprung balance assembly mounted in the mechanical horological movement, the attachment of the balance spring to the stud inducing, in the coils of the balance spring, a resilient stress as a result whereof the stop means is engaged in a captive manner within the recess in the stud.

According to a special embodiment of the invention, the stop means is hook-shaped.

According to a special embodiment of the invention, the hook is T-, L-, U- or anchor-shaped.

According to another special embodiment of the invention, the balance spring is made of silicon, for example by plasma-arc cutting a silicon wafer.

Thanks to these features, the present invention provides a horological assembly formed by a stud and a balance spring, an outer last coil whereof can be reliably attached to the stud. More specifically, the passage of the balance spring from a position wherein its coils are arranged off-centre relative to one another when it is in the free state into a position wherein its coils are centred when the free end of its outer last coil is attached to the stud causes resilient tension to be applied to the coils of the balance spring, as a result whereof the stop means is engaged in a captive manner within the stud. Thanks to the invention, the balance spring can thus be attached to its stud without the need for adhesive or pins, or operations such as clamping or crimping, etc. This thus protects against issues related to the ageing of the adhesive, which can cause the balance spring to become detached from the stud, causing the watch to stop. Similarly, attaching the balance spring according to the invention requires a simple operation of engaging the free end of the outer last coil thereof inside the recess made in the stud. This avoids assembly operations as far as possible, reducing assembly and production times and thus reducing cost prices. Similarly, strictly limiting the assembly operations also ensures excellent reproducibility in terms of the functioning of sprung balance assemblies comprising a balance spring according to the invention. Thus, with the balance spring according to the invention, the coils S1, . . . , Sn−1 of the balance spring 1 are arranged off-centre when the balance spring 1 is in the concentric state, and rearrange themselves concentrically when the balance spring is in the mounted state inside the sprung balance assembly, this sprung balance assembly being at rest.

Moreover, it is also of interest to note that, contrary to the prior art where it is always ensured that the free end of the outer last coil of the balance spring can be attached to the stud while generating as little stress as possible in order to preserve the isochronal qualities of the resulting regulating assembly, in the case of the invention, the stopping means is attached to the stud under stress, this stress inducing a mechanical tension in the balance spring which will guarantee that the outer last coil of the balance spring is locked onto the stud while simultaneously guaranteeing the timing performance of the regulating assembly by the concentric rearrangement of the coils of the balance spring.

BRIEF DESCRIPTION OF THE FIGURES

Other features and advantages of the present invention will be better understood upon reading the following detailed description of one embodiment of the balance spring according to the invention, said example being provided for the purposes of illustration only and not intended to limit the scope of the invention, given with reference to the accompanying drawing, in which.

DETAILED DESCRIPTION OF THE INVENTION

The present invention was drawn from the general inventive idea consisting of providing a balance spring which, in the non-mounted state, when no stress other than the force of gravity is exerted thereon, has coils that are off-centre, such that the space separating two consecutive coils from the following two coils is not the same as the distance of the coils from the centre of the balance spring materialised by its inner first coil increases. On the other hand, the balance spring according to the invention is arranged such that, when it is attached to the stud by the free end of its outer last coil, its coils are centred, such that its coils extend concentrically. According to one advantage of the invention, the passage of the balance spring from its free state, wherein its coils are off-centre, to the state wherein it is attached to the stud, and wherein its coils are centred, causes resilient tension to be applied to its coils, as a result whereof the stop means provided at the free end of its outer last coil is engaged in a captive manner inside the recess made in the stud. The balance spring according to the invention is thus attached without the use of adhesive or specific tooling. This attachment is thus simpler and quicker to produce, and is more reliable compared to balance springs of the prior art. Moreover, since the operation of attaching the balance spring according to the invention to its stud requires virtually no assembly other than sliding the stop means into the recess in the stud, the functioning of the resulting sprung balance assemblies is less dependent on the skill of the operators or on the correct setting of the machines for attaching the balance springs and is thus far more reproducible.

Figure 1:
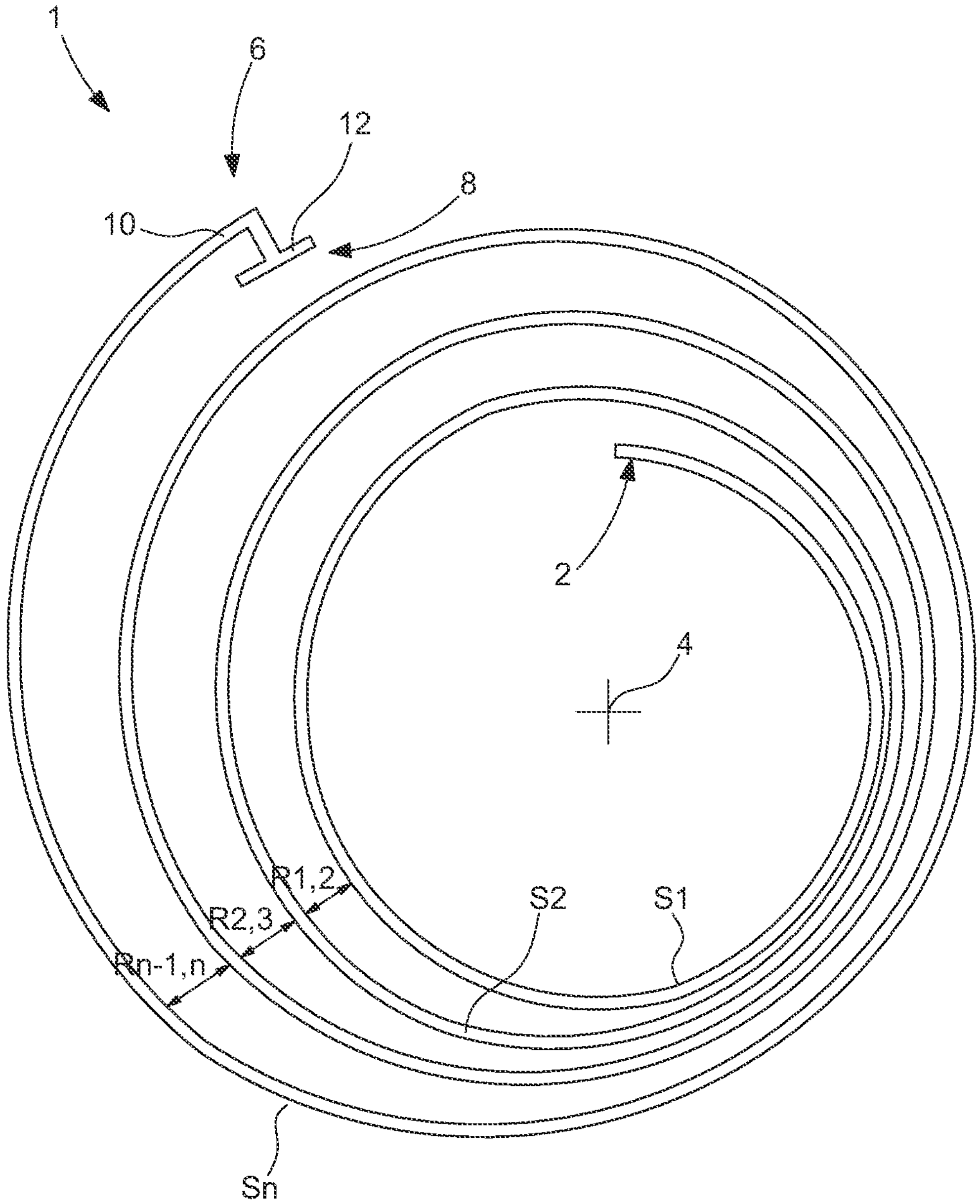
FIG. 1 is a top view of a balance spring according to the invention in the free state wherein the coils are off-centre.

One example embodiment of a balance spring according to the invention is shown in FIG. 1. Denoted as a whole by the general reference numeral 1, this balance spring comprises a plurality of coils S1, S2, . . . , Sn which extend between an inner first coil 2 which is located at the centre 4 of the balance spring 1, and an outer last coil 6 which is located outside the balance spring 1. As shown in FIG. 1, the balance spring 1 is in a free state wherein no constraint is exerted thereon other than the force of the Earth's gravity. In this free state, the balance spring 1 is in a rest position wherein its coils S1, . . . , Sn are off-centre, i.e. a position wherein the distance R2,3 separating the second coil S2 from the third coil S3 is not the same as the distance R1,2 separating the first coil S1 from the second coil S2. The same is repeated between each pair of consecutive coils as the distance of the coils from the centre 4 of the balance spring 1 increases. FIG. 1 also shows that the outer last coil 6 ends in a stop means which is made in one piece with the balance spring 1. This stop means takes the form of a hook 8, for example a T-shaped hook, comprising a foot 10 and a head 12 perpendicular to one another. In the example shown in the drawing, the foot 10 and the head 12 of the hook 8 are each formed from a bar that has the same cross-section as that of the coils S1, . . . , Sn of the balance spring 1. It goes without saying that, in particular if the balance spring 1 is cut from a silicon wafer or made of metal using the LIGA process, the hook 8 can have a different cross-section to that of the coils S1, . . . , Sn of the balance spring 1. The cross-section of the hook 8 could even be varied locally in order to adapt the mechanical stiffness of the various elements that make up the hook 8 for optimum attachment of the hook 8 to the stud 14. The hook 8 is arranged in such a way that, if it is T-shaped, the bar forming the head 12 of this hook 8 extends substantially parallel to the last coil Sn of the balance spring 1. It should be noted that the stop means, such as the hook 8, does not contribute to the useful length of the balance spring 1.

Figure 2A:
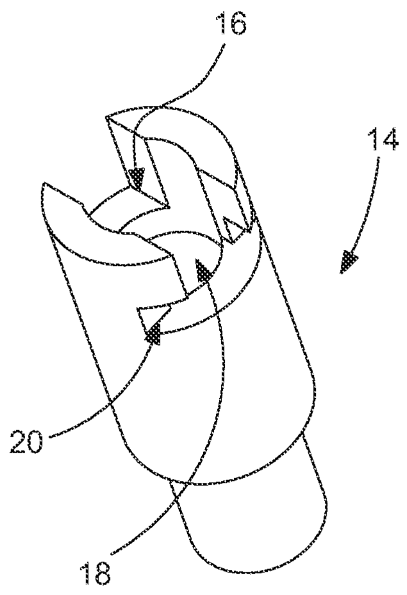
FIGS. 2A and 2B are perspective views of a stud according to the invention.

FIG. 2A is a perspective view of a stud according to the invention. Denoted as a whole by the general reference numeral 14, this stud can take the form of a cylinder, without being limited thereto. The stud 14 comprises a base 16 in which a recess such as a groove 18 is made, which recess extends through the base 16 from end to end. This groove 18 leads to a slot 20 made in the stud 14 transversely to the groove 18.

Figure 3A:
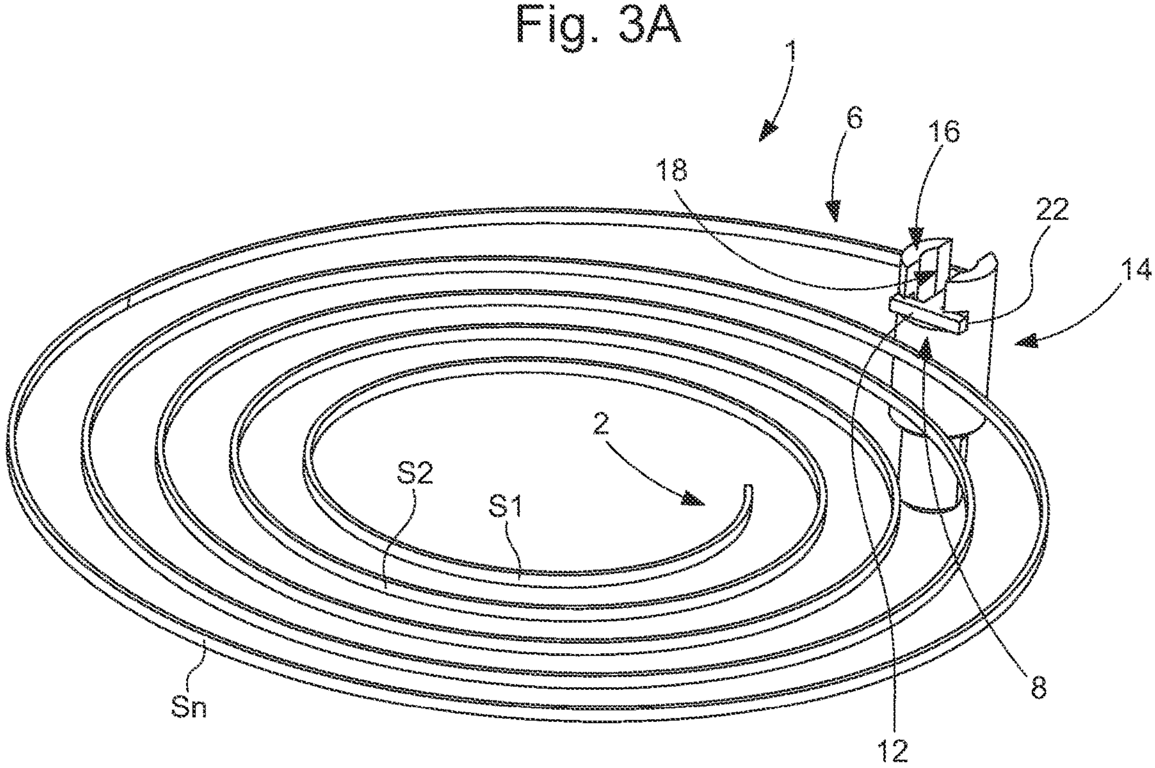
FIG. 3A is a perspective view showing the balance spring attached by its outer last coil to the stud.
Figure 3B:
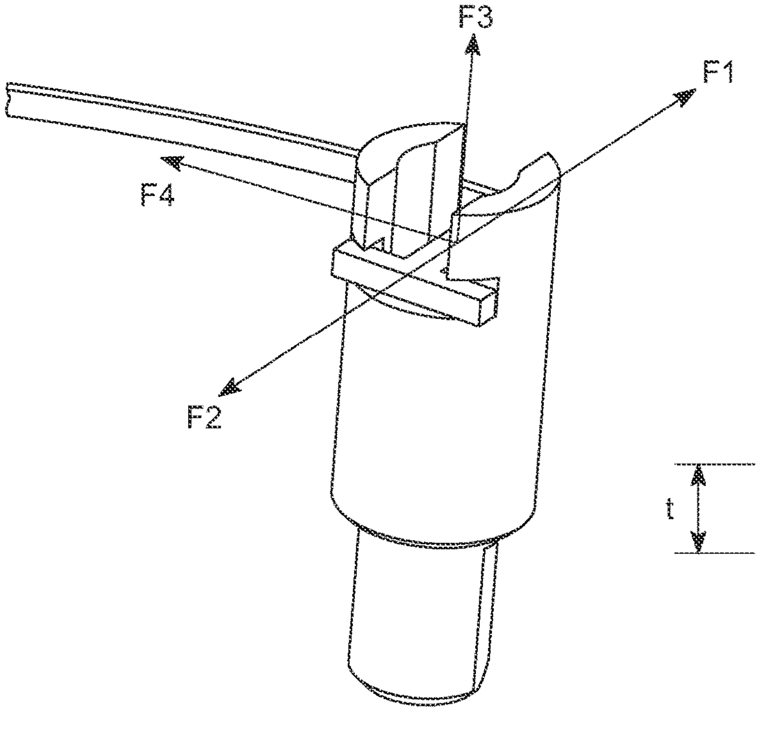
FIG. 3B is a more large-scale view of the stud in FIG. 3A.

FIG. 3A is a perspective view showing the balance spring 1 attached to the stud 14 via its outer last coil 6. To achieve this, the hook 8 is slid into the groove 18 in the stud 14, then immobilised by bringing its head 12 to rest against the back 22 of the slot 20. According to the invention, once the balance spring 1 has been attached to the staff of the balance by its inner first coil 2 and to the stud 14 by its outer last coil 6, the balance spring 1 adopts a centred position wherein its coils S1, . . . , Sn are arranged concentrically, preferably but not necessarily at equal distances from one another. The fact that the balance spring 1 moves from its eccentric position at rest, when it is free, to its centred position once it is attached to the stud 14, induces a resilient stress in the free end of the outer last coil 6, as a result whereof the stop means is engaged in a captive manner inside the slot 20 in the stud 14. More specifically, when the balance spring 1, once attached to the stud 14, is in its centred position wherein the coils S1, . . . , Sn are concentric, the resulting resilient force F1, directed radially outwards from the balance spring, works to push the head 12 of the hook 8 radially outwards, against the back 22 of the slot 20, which makes the mounting virtually captive. In fact, for the stop means to separate from the stud 14, a force would have to be applied to the free end of the outer last coil 6 of the balance spring 1, which force would have to comprise (see FIG. 3B) a first component F2 directed radially towards the centre 4 of the balance spring 1 to allow the head 12 of the hook 8 to disengage from the slot 20 in the stud 14, and a second component F3 directed towards the outside of the groove 18 made in the base 16 of the stud 14, in order to allow the foot 10 of the hook 8 to disengage from this groove 18, which is practically impossible in the case of mechanical impacts, for example during normal use of the watch.

Figure 4:
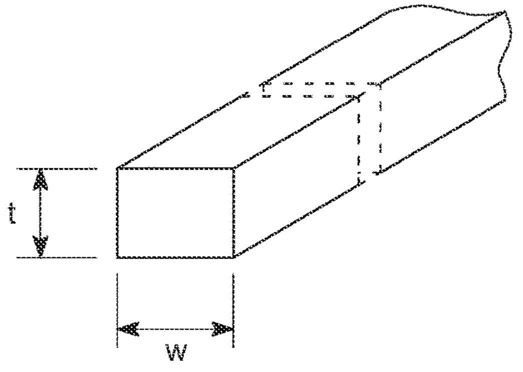
FIG. 4 is a sectional view of a bar of silicon.

The balance spring 1 according to the invention can, for example, be formed from a silicon bar having a width w and a thickness t (see FIG. 4) obtained by means of the method described in the European patent application EP 1 422 436 A1. For example, it can be produced by plasma-arc cutting a monocrystalline silicon wafer and can include a silicon core coated with an outer layer of silicon oxide with thermal compensation properties.

The balance spring 1 according to the invention can also be obtained by means of the manufacturing method described in the international application WO 2019/180177 A1. Briefly described, this method for manufacturing a silicon balance spring consists of:

- providing an SOI disc, which consists of two layers of silicon bonded together by a buried silicon oxide layer. Each of these three layers plays a very specific role: the top layer of silicon, referred to as the "device" layer, is formed from a monocrystalline silicon wafer and has a thickness that determines the thickness of the balance springs to be manufactured; the bottom layer of silicon, referred to as the "handle" layer, which essentially acts as a mechanical support, is also formed from a monocrystalline silicon wafer, typically with the same crystallographic orientation as the top layer of silicon; finally, the buried oxide layer intimately bonds the top and bottom layers of silicon and acts as a barrier during subsequent operations;
- growing a silicon oxide layer on the surface of the top layer of silicon;
- depositing a photoresist layer on the silicon oxide layer and forming a mask in the photoresist layer by photolithography, which mask corresponds to the balance springs to be produced in the top layer of silicon;
- etching the silicon oxide layer in the exposed areas of the mask;
- deep reactive ion etching (DRIE) the top layer of silicon to form the balance springs, this etching being stopped when the buried silicon oxide layer bonding the top and bottom layers of silicon is reached; the balance springs to be manufactured are then patterned throughout the thickness of the top layer of silicon, now revealed by this DRIE operation. The components remain integral with the bottom layer of silicon to which they are bonded by the buried silicon oxide layer;
- re-growing a silicon oxide layer on the surface of the silicon to protect the balance springs during the operation for separating them from the bottom layer of silicon.

The balance spring 1 according to the invention can also be made of metal or a metal alloy, for example by means of the LIGA process (Lithographische Galvano Abformung in German): after a layer of photosensitive polymer has been deposited on a substrate by centrifugation, this layer of photosensitive polymer is used to form a recessed structure corresponding to the desired contour of the balance spring 1 by photolithography. To this end, the layer of photosensitive polymer, the thickness whereof corresponds to the desired height of the coils of the balance spring 1, is exposed to light through a photolithography mask and then chemically etched to obtain the recessed structure corresponding to the desired contour of the balance spring 1. The recessed structure is then filled with a metal or metal alloy, for example by electroplating or by compression and sintering (U.S. Pat. No. 4,661,212), and finally the recessed structure is chemically dissolved and the balance spring 1 is released.

Figure 2B:
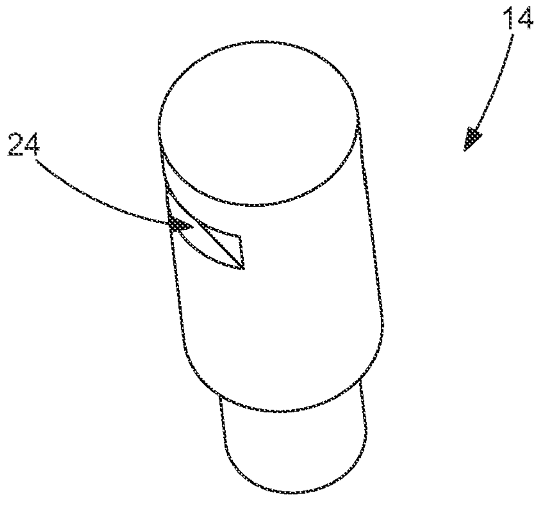
Figure 5A:
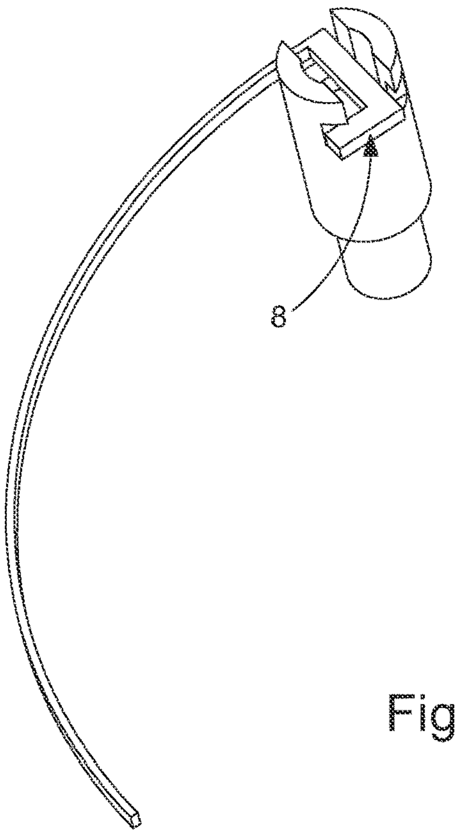
FIGS. 5A and 5B illustrate different embodiments of the stop means provided at the free end of the outer last coil of the balance spring according to the invention, with FIG. 5A showing an L-shaped hook oriented inwards and FIG. 5B showing an L-shaped hook oriented outwards.
Figure 5B:
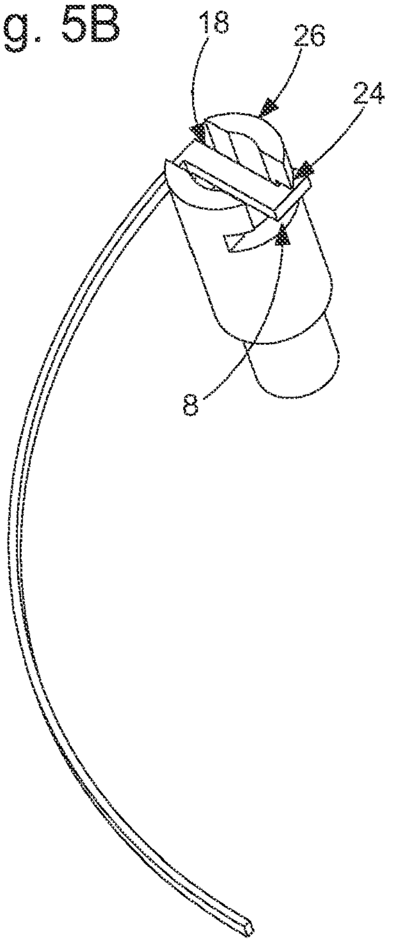
Figure 6:
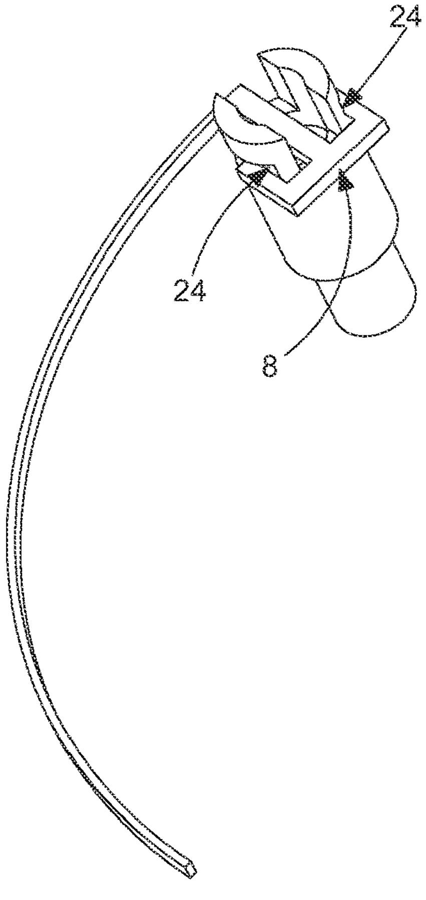
FIG. 6 illustrates yet another embodiment of the stop means in the form of an anchor shaped hook.
Figure 7A:
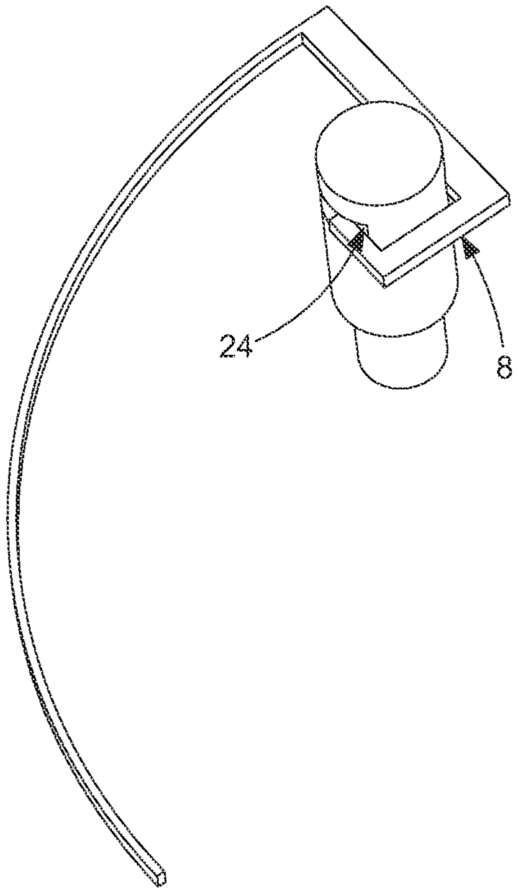
FIGS. 7A and 7B illustrate still further embodiments of the stop means in the form of a U-shaped hook.
Figure 7B:
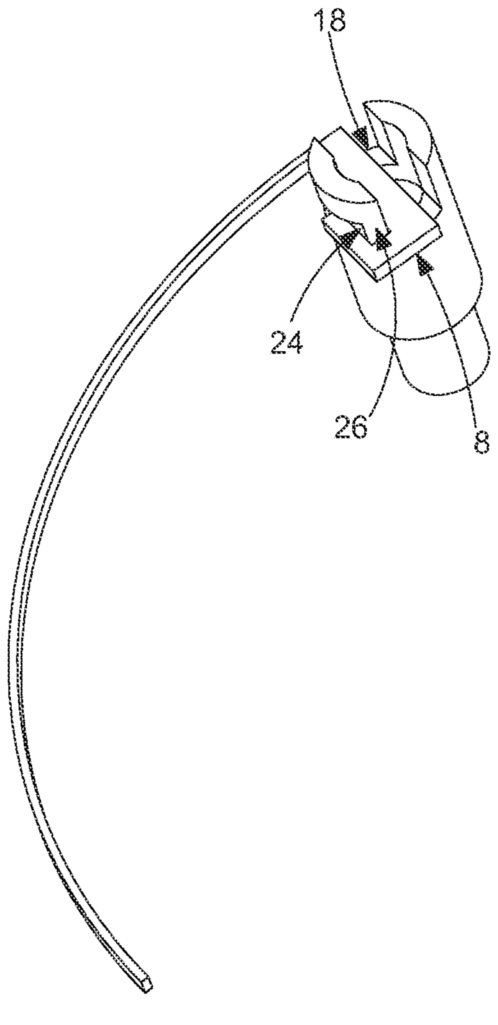

It goes without saying that the present invention is not limited to the embodiment described hereinabove and that various simple alternatives and modifications can be considered by a person skilled in the art without leaving the scope of the invention as defined by the accompanying claims. In particular, it should be noted that during a period of operation of a sprung balance assembly equipped with a balance spring 1 according to the invention, when the balance spring 1 alternately contracts and expands, a pulling/pushing force F4 directed along the outer last coil 6 is exerted on the stop means without there being any risk of the stop means separating from the stud 14, this being prevented by the engagement of the foot 10 of the hook 8 in the groove 18. Moreover, other shapes of the hook 8 can of course be envisaged, for example an "L" shape, oriented inwards (see FIG. 5A) or outwards (see FIG. 5B), or an anchor shape (see FIG. 6), or even a "U" shape (see FIGS. 7A and 7B). Other forms of the recess made in the base of the stud 14 can also be envisaged: rather than a slot 20 extending transversely to the groove 18, at least one and preferably two notches 24 can be made parallel to the groove 18, on either side thereof. This embodiment is particularly well suited to cases where the hook 8 is L-shaped or shaped like an anchor. The free end of the outer last coil 6 of the balance spring 1 is still attached to the stud 14 by inserting the hook 8 into the groove 18 in the stud 14, then locking the free ends of the hook 8 in the one or more notches 24. It is understood that the opening of the hook 8 must be equal to or close to the thickness of the wall 26 separating the groove 18 from the notch 24. As shown in FIGS. 2B and 7A, in the event that the hook 8 is U-shaped, the groove 18 can be entirely dispensed with, while providing, on the stud 14, only one or two notches 24 in the peripheral wall of the stud 14.

NOMENCLATURE

1. Balance spring
2. Inner first coil
S1, S2, . . . , Sn. Coils
4. Centre
6. Outer last coil
R1,2, R2,3 Distance
8. Hook
10. Foot
12. Head
14. Stud
16. Base
18. Groove
20. Slot
22. Back
24. Notches
26. Walls

The invention claimed is:

1. A balance spring for a sprung balance assembly of a mechanical horological movement, the balance spring comprising:

a succession of coils which extend between a first free end of an inner first coil, and a second free end of an outer last coil, the balance spring having a natural state in which the coils are arranged off-centre, and the second free end of the outer last coil of the balance spring terminating in a stop means, wherein the coils are configured to be mounted inside the sprung balance assembly with the inner first coil attached to a staff of the balance and the stop means attached to a stud, and wherein, in a mounted state of the balance spring inside the sprung balance assembly, the coils are rearranged concentrically and induce a resilient stress in the coils that keeps the second free end of the outer last coil attached to the stud.

2. The balance spring according to claim 1, wherein the stop means takes the shape of a hook.

3. The balance spring according to claim 2, wherein the hook is T-, L-, U- or anchor-shaped.

4. The balance spring according to claim 1, wherein the balance spring is made of silicon.

5. A horological assembly formed by a balance spring and a stud for a sprung balance assembly of a mechanical horological movement, the balance spring being formed by a succession of coils which extend between a first free end at an inner first coil, and a second free end at an outer last coil, the balance spring having a natural state in which the coils are arranged off-centre, the second free end of the outer last coil of the balance spring terminating in a stop means, and the stud comprising a base with a recess that receives the stop means, wherein the coils are rearranged in a concentric manner when the balance spring is attached to the stud, inducing a resilient stress in the coils that keeps the stop means engaged within the recess in the stud.

6. The horological assembly formed by a balance spring and a stud according to claim 5, wherein the recess is formed by a groove which extends on either side of the base, the groove leading to a slot made in the stud transversely to the groove.

7. The horological assembly formed by a balance spring and a stud according to claim 5, wherein at least one notch is made parallel to a groove.

8. The horological assembly formed by a balance spring and a stud according to claim 7, wherein two notches are made parallel to a groove, on either side of the groove.

9. The horological assembly formed by a balance spring and a stud according to claim 5, wherein the recess is formed by one or two notches made in a peripheral wall of the stud.

* * * * *